(12) United States Patent
Chen

(10) Patent No.: US 6,739,022 B1
(45) Date of Patent: May 25, 2004

(54) ROTARY BUCKLE STRUCTURE

(76) Inventor: Ying-Chih Chen, 220, Ta Pu Road, Changhua (TW)

(*) Notice: Subject to any disclaimer, the term of this patent is extended or adjusted under 35 U.S.C. 154(b) by 0 days.

(21) Appl. No.: 10/292,760

(22) Filed: Nov. 13, 2002

(51) Int. Cl.[7] .................... F16B 45/04; A44B 13/00
(52) U.S. Cl. ................. 24/598.1; 24/265 H; 24/600.4

(56) References Cited

U.S. PATENT DOCUMENTS

| | | | | |
|---|---|---|---|---|
| 5,146,657 A | * | 9/1992 | Frano | 24/265 H |
| 5,450,661 A | * | 9/1995 | Rekuc | 24/599.6 |
| 5,502,878 A | * | 4/1996 | Anscher | 24/265 H |
| 6,286,190 B1 | * | 9/2001 | Friend et al. | 24/265 H |

* cited by examiner

Primary Examiner—Robert J. Sandy
(74) Attorney, Agent, or Firm—Rabin & Berdo, P.C.

(57) ABSTRACT

The present invention relates to a rotary buckle structure which includes a buckle member and a rotary member. The bottom of the buckle member and rotary member are respectively coupled by way of a downwardly tapered conical body, and conical hole, and which have the same concentric axis. A length of surface of external circumference is longer than the length of the inner circumference of the conical hole. This arrangement improves the traditional buckle and effectively reduces the wearing to prevent the entire buckle set from loosening or falling off, and thus extends the life of use.

3 Claims, 4 Drawing Sheets

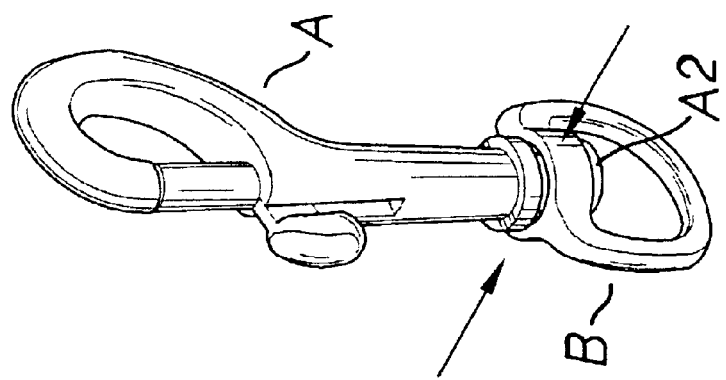
FIG.1-D
PRIOR ART
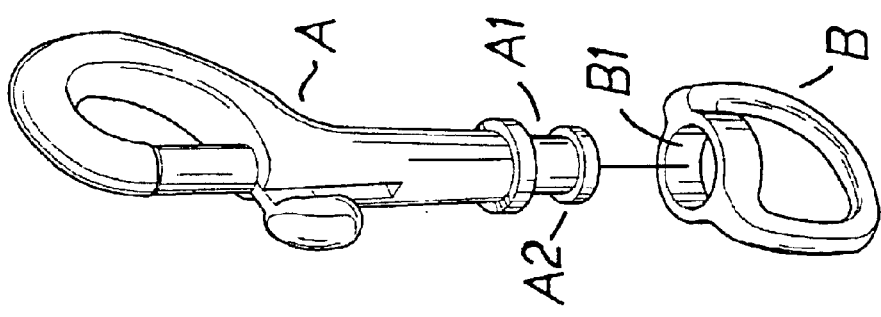
FIG.1-A
PRIOR ART

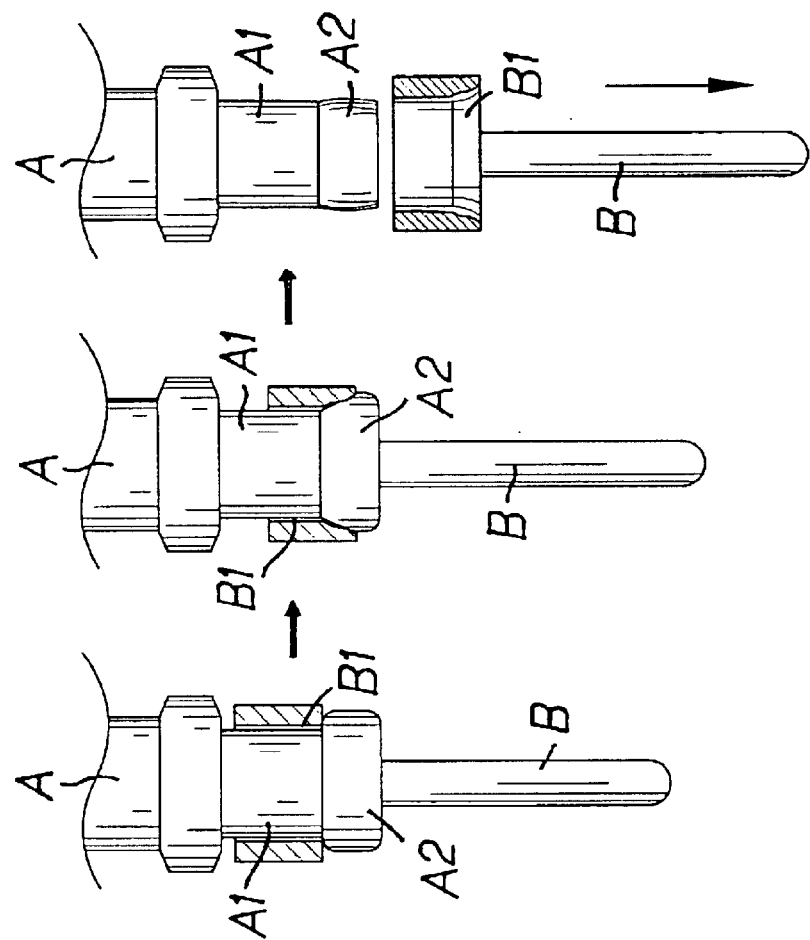
FIG.1-E
PRIOR ART
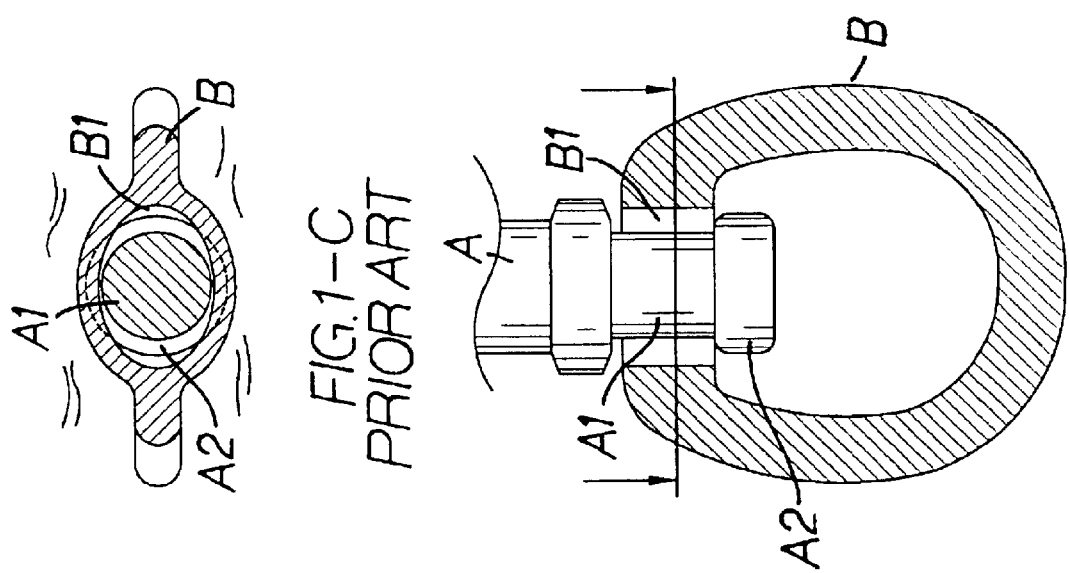
FIG.1-C
PRIOR ART
FIG.1-B (PRIOR ART)

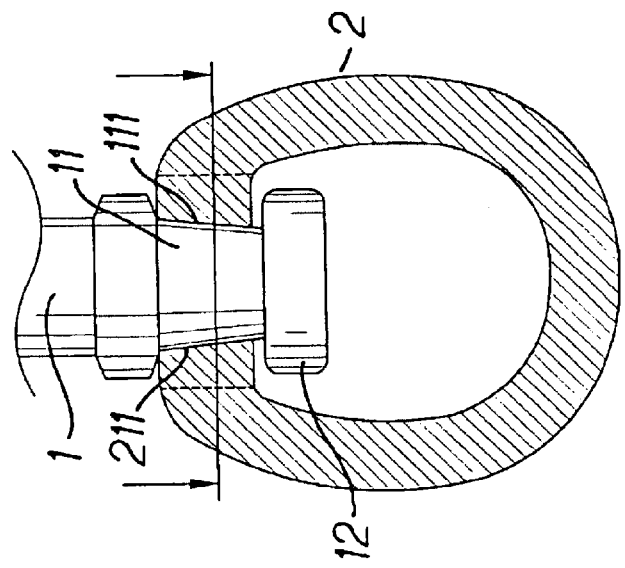
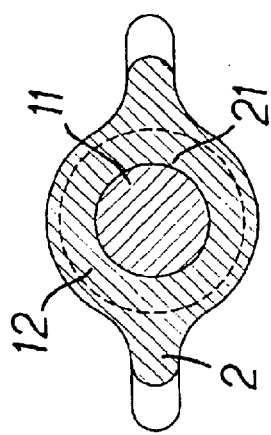
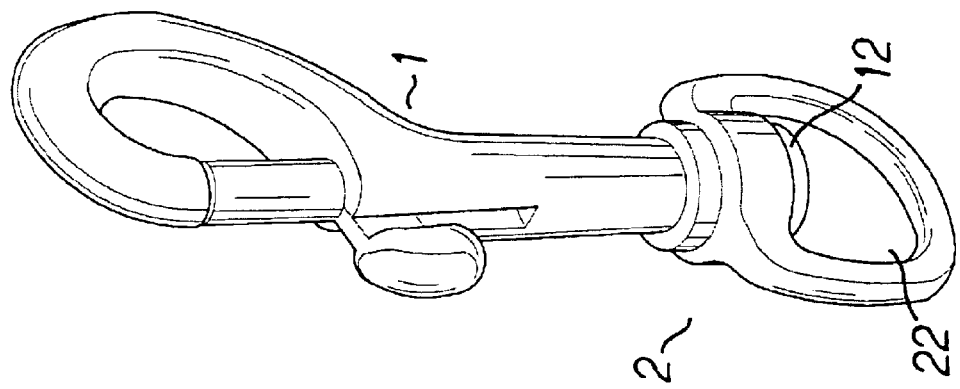

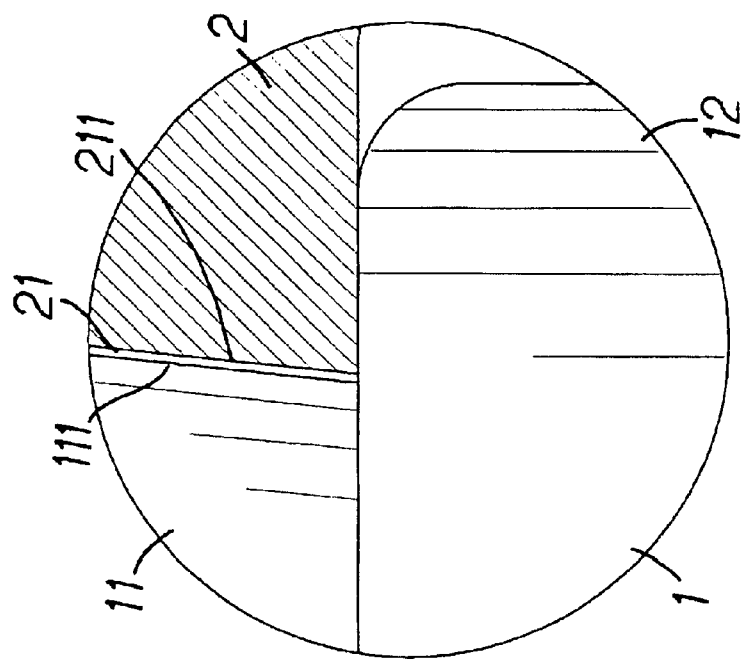
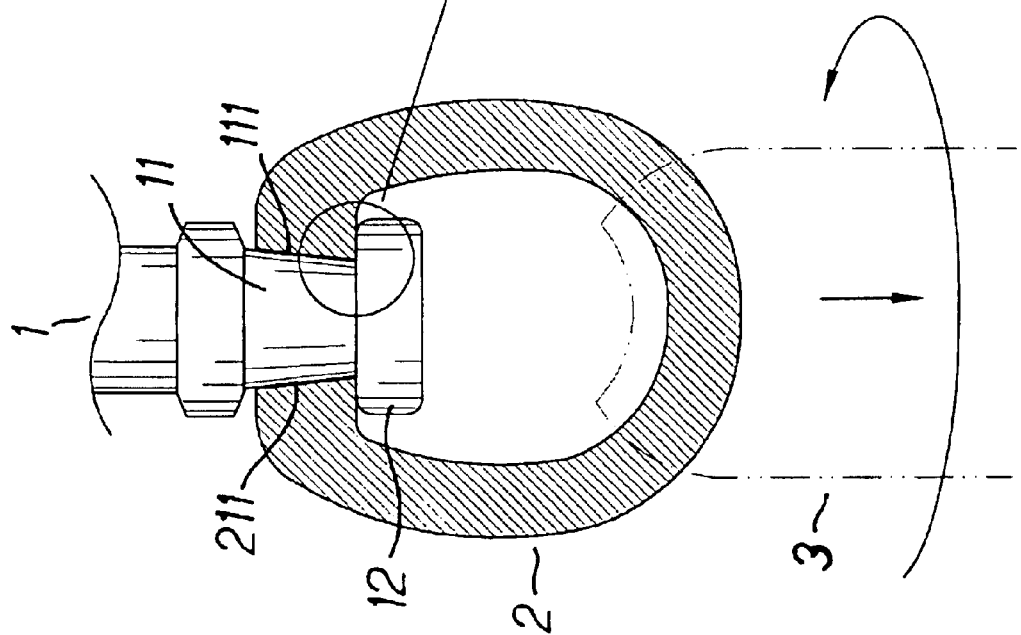
FIG. 4-B
FIG. 4-A

US 6,739,022 B1

ROTARY BUCKLE STRUCTURE

BACKGROUND OF THE INVENTION

1. Field of the Invention

The present invention relates to a rotary buckle structure, more particularly to a rotary buckle structure comprising a downwardly tapered conical body and a conical hole at the bottom of a buckle member and a rotary member with the same concentric axis respectively, and the length of external circumference is longer than the length of the inner circumference. After the coupling is completed, the accessory passes through the through hole of the rotary member, and when an object is hung on the buckle member, the accessory on the rotary member moves the buckle member downward due to the weight of the accessory, so that the external surface of the external circumference in the conical hole and the inner wall of the conical body no longer attach to each other closely but pivotally coupled together for a free rotation. The present invention improves the traditional buckle that may fall off due to the wearing over a period of time, and thus extends the life of use.

2. Description of the Related Art

At present, there are all kinds of buckles for a wide range of applications. For example, buckles are commonly used for hooking or hanging objects such as the buckle used on the strap of a purse, key chain, decorative ribbon, pet ribbon, and industrial hook and strap, etc; wherein the buckling of a buckle set is nothing more than two ways: either moving along the axis at the pulling and pressing section of the buckle or processing in displacement in the vertical direction. Regardless of the opening and closing operation, a buckle A has a rotary member B disposed at its bottom, so that after an object is hooked or hanged, the rotary member B at the bottom will pass through the desired accessory and rotate freely to facilitate the application made by the user, as shown in FIG. 1A. The manufacturing process of such buckle includes the manufacturing and shaping of the body of the buckle member A and the rotary member B separately as shown in FIG. 1A; wherein the buckle member A at its bottom has a concave section A1 and forms a blocking ring A2 at its utmost bottom, and the rotary member B has a through hole B1 such that after the concave section A1 at the bottom of the buckle member A passes through the through hole B1 (as shown in FIG. 1B), the manufacturing equipment squeezes both sides of the through hole B1 for deformation (as shown in FIG. 1C). Therefore, the through hole B1 of the rotary member B is reduced in its diameter from a larger blocking ring A2 to a smaller one (as shown in FIG. 1D) such that the buckle member is restricted by the rotary member B, but can be used for a circular rotation. However, after being used for a period of time, it is found that the external diameter of the blocking ring A2 of the buckle member A at the utmost bottom is larger than the inner diameter of the through hole B1 of the rotary member B. Therefore, the operation is normal (as shown in the left side-view diagram of FIG. 1E). The rotary member B has an accessory passing through, and regardless of the accessory being driven vertically or aslant to an angle with respect to the rotary member B, it will cause the through hole B1 of the rotary member B to constantly rub against the blocking ring A2 of the buckle member A. Further, the through hole B1, concave section A1, and the blocking ring A2 are not in a concentric axis, and the through hole B1 will progressively expand, and the blocking ring A2 will be worn and reduced in size more quickly (as shown in the middle diagram of FIG. 1E). After a while, the rotary member B and the accessory will fall off from the buckle member A (as shown in the right diagram of FIG. 1E) as the size of these objects varies, so that the rotary member B and accessory may be lost unknowingly. If the accessory is an important item such as the key of your home, factory, office, or car, there is no way to find them back. Although the whole set of buckle itself is not that important, the problem is serous and troublesome and even may hold things up once the key is lost.

For the aforesaid problem, the inner diameter of the through hole B1 should be slightly larger than the blocking ring A2 but not too large, so that there is some kind of limitation to the deformation caused by squeezing both sides of the through hole B1 of the rotary member B. Otherwise, the through hole is pressed again and again, and will break or damage the rotary member B. Of course, if the inner diameter of the through hole B1 is smaller than that of the blocking ring A2, then it is impossible for the manufacturing or pressing.

Therefore, in view of the problems caused by the traditional way of manufacturing and application, the inventor of the present invention based on years of experience accumulated from the engagement in the related industry conducted extensive research to resolve the aforementioned problem and invented the present invention.

SUMMARY OF THE INVENTION

The primary objective of the present invention is to provide a rotary buckle structure, comprising a buckle member for hooking and hanging objects and a rotary member coupled to its bottom; the buckle member at its bottom has a downwardly tapered conical body with a concave section, and a blocking ring is disposed at its utmost bottom. After the bottom of the buckle member is wrapped by the manufacturing mold, and the material poured inside to shape the body of the rotary member, the conical hole on rotary member is restricted in the conical body of the buckle member. The rotary member and the buckle member have the common downwardly tapered conical hole and conical body with the same concentric axis, and the length of the external surface of the conical body is slightly larger than the length of the inner wall of the conical body, so that after the buckle member and the rotary member are coupled, the through hole of the rotary member receives the accessories. When an object is hooked or hanged on the buckle member, the accessory on the rotary member moves downward due to the weight of the accessory, and the external surface of the conical hole and the inner wall of the conical body no longer attach with each other for a free rotation. Such arrangement improves the shortcomings of the prior art that the rotary member will fall off due to the wear over a period of time, and it thus extends the life of use.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which:

FIG. 1A is a diagram of the external look and disassembled parts of the prior art.

FIG. 1B is a cross-sectional diagram of a section of the prior art when it is in use.

FIG. 1C is a top-view cross-section diagram of the prior art when it is in use.

FIG. 1D is a diagram of the external look of the prior art when it is assembled.

FIG. 1E is a diagram of the prior art when it is in use.

FIG. 2 is a structural diagram of the present invention.

FIG. 3A is a cross-sectional diagram of a section of the present invention after the buckle member and the rotary member are coupled.

FIG. 3B is a top-view cross-sectional diagram of a section of the present invention after the buckle member and the rotary member are coupled.

FIG. 4A is an illustrative diagram showing the downward movement of the rotary member of the present invention.

FIG. 4B is an enlarged diagram of a section of the present invention.

DETAILED DESCRIPTION OF THE PREFERRED EMBODIMENTS

Please refer to FIGS. 2, 3A, and 3B and the following detailed description. The rotary buckle structure of the present invention comprises a buckle member 1 for hooking or hanging objects and a rotary member 2 at its bottom; wherein a pulling and pressing or squeezing movement with no particular form is performed on the buckle member 1, and the bottom of the buckle member 1 is a downwardly tapered conical body (shaft) 11 with a concave section, and a blocking ring 12 is disposed at its utmost bottom. The external diameter of the blocking ring 12 is larger than the external diameter of the conical body 11. After the bottom of the buckle member 1 is wrapped by the mold of manufacturing equipment and material poured inside the mold to shape the body of the rotary member 2, the conical hole 21 of the rotary member 2 is restricted into the conical body 11 of the buckle member 1. The rotary member 2 and the buckle member 1 have the downwardly tapered conical hole 21 and conical body 11 with the same concentric axis (as shown in FIG. 3B), and the length of the external surface 111 of the conical body 11 is slightly larger than inner wall 211 in the conical hole 21 (as shown in FIG. 3A).

After the buckle member 1 and the rotary member 2 are coupled, the through hole 22 of the rotary member 2 is for passing the accessory 3 (such as strap or key, etc) as shown in FIG. 4A. Such manufacturing makes use of the same concentric axis of the conical hole 21 and the conical body 11, and their gap is very small, which can greatly reduce the shaking and wearing between the conical hole 21 and the conical body 11 (because different concentric axes will expedite the wearing) and significantly increase the external circumference of the blocking ring relative to the external diameter of the conical body 11. Such arrangement has improved the manufacturing, wearing, and attaching function of the prior art.

When the buckle member 1 has not been hooked or the accessory 3 of the rotary member 2 has not driven the rotary member 2, the external surface 111 of the conical hole 11 and the inner wall 211 of the conical body 21 are attached closely, as shown in FIG. 3A. When the buckle member 1 is hooked with an object or the accessory 3 of the rotary member 2 is driven to move the rotary member 2, the weight of the accessory 3 moves the rotary member 2 downward, so that the inner wall 211 no longer attaches closely to the external wall surface 111, as shown in FIGS. 4A and 4B. Since the inner wall 211 and the external surface 111 no longer attach closely with each other, the rotary member 2 can rotate freely.

In summation of the above description, the present invention not only has a breakthrough over the manufacturing technology, but also effectively reduces the wearing to prevent the entire buckle set from loosening and falling off, and thus extends the life of use. The present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rotary buckle structure, comprising:

a buckle member for hooking an object, a bottom of said buckle member having a downwardly tapered conical shaft, and a blocking ring disposed at an utmost end of said shaft; and a rotary member having a downwardly tapered conical hole adapted to receive said conical shaft;

wherein said conical shaft has a length that is greater than a depth of the conical hole, so that when said conical shaft is received within the conical hole of said rotary member, said rotary member is axially movable relative to said buckle member;

wherein an angle of inclination of the tapered conical hole is about equal to an angle of inclination of said conical shaft, so that a shape of the conical hole matches a shape of said conical shaft;

wherein the conical hole and said conical shaft have concentric axes;

wherein a diameter of an uppermost portion of said shaft is about equal to a diameter of an uppermost portion of the conical hole, so that when the uppermost portion of the conical hole and the uppermost portion of said shaft are disposed immediately adjacent to each other, an outer surface of said shaft will tightly engage with a wall of said rotary member that defines the conical hole, so that said rotary member will be prevented from rotating relative to said buckle member; and wherein a diameter of a lowermost portion of said shaft is less than a diameter of a lowermost portion of the conical hole, so that when said buckle member and said rotary member are pulled in opposite directions, the uppermost portion of the conical hole will be moved away from the uppermost portion of said shaft, and a gap will be formed between the outer surface of said shaft and the wall of said rotary member that defines the conical hole, so that said rotary member is free to rotate relative to said buckle member.

2. The rotary buckle structure recited in claim 1, wherein the wall of said rotary member that defines the conical hole is completely free of slots.

3. The rotary buckle structure recited in claim 1, wherein when the uppermost portion of the conical hole and the uppermost portion of said shaft are disposed immediately adjacent to each other, an entire outer surface of said shaft will tightly engage with the wall of said rotary member that defines the conical hole, with no gaps therebetween.

* * * * *